United States Patent
Dupays et al.

(10) Patent No.: US 11,512,615 B2
(45) Date of Patent: Nov. 29, 2022

(54) DEVICE FOR SUPPLYING AN OIL TANK FROM A SECOND TANK

(71) Applicant: SAFRAN AIRCRAFT ENGINES, Paris (FR)

(72) Inventors: Clement Dupays, Moissy-Cramayel (FR); Mathieu Jean Jacques Santin, Moissy-Cramayel (FR); Caroline Marie Frantz, Moissy-Cramayel (FR); Benoit Gaillot-Drevon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/771,401

(22) PCT Filed: Dec. 17, 2018

(86) PCT No.: PCT/FR2018/053336
§ 371 (c)(1),
(2) Date: Jun. 10, 2020

(87) PCT Pub. No.: WO2019/122658
PCT Pub. Date: Jun. 27, 2019

(65) Prior Publication Data
US 2020/0340375 A1  Oct. 29, 2020

(30) Foreign Application Priority Data
Dec. 20, 2017  (FR) ...................... 1762603

(51) Int. Cl.
*F01M 1/16* (2006.01)
*F01M 11/12* (2006.01)
(Continued)

(52) U.S. Cl.
CPC .............. *F01M 1/16* (2013.01); *F01M 11/12* (2013.01); *F02C 7/06* (2013.01);
(Continued)

(58) Field of Classification Search
CPC .. F01M 1/16; F01M 11/12; F01M 2011/0095; F01M 11/061; F02C 7/06;
(Continued)

(56) References Cited

U.S. PATENT DOCUMENTS

| | | | |
|---|---|---|---|
| 4,012,012 A | 3/1977 | Ligler | |
| 2004/0250838 A1* | 12/2004 | Kim | ................. H01L 21/67253 134/25.4 |
| 2010/0042310 A1* | 2/2010 | Shinogi | ................... G01F 23/80 123/196 R |

FOREIGN PATENT DOCUMENTS

| | | | | |
|---|---|---|---|---|
| FR | 3 013 330 A1 | 5/2015 | | |
| FR | 3 020 093 A1 | 10/2015 | | |
| FR | 3020093 A1 * | 10/2015 | ........... | F01M 11/061 |

OTHER PUBLICATIONS

International Search Report and Written Opinion (with English Translation of Categories of Cited Documents) dated Apr. 4, 2019 in PCT/FR2018/053336 filed on Dec. 17, 2018, 12 pages.

(Continued)

*Primary Examiner* — Yi-Kai Wang

(74) *Attorney, Agent, or Firm* — Oblon, McClelland, Maier & Neustadt, L.L.P.

(57) ABSTRACT

An evaluation of the oil level of an aircraft engine tank from doses of oil delivered from another tank by a pump can be checked by comparing the evaluation of the volume provided by a sensor associated with the engine tank with an estimation of the volume extracted from the aircraft rank, either by another level sensor associated with this tank, or directly from the control of the pump. This comparison is made by a module capable of notifying staff of the need to check or maintain the device, and in particular to check if the sensor is operating correctly. Application to aeronautics, in particular to devices wherein a single aircraft tank supplies all the engine tanks.

8 Claims, 4 Drawing Sheets

(51) Int. Cl.
*F02C 7/06* (2006.01)
*F01M 11/00* (2006.01)
(52) U.S. Cl.
CPC ............... *F01M 2011/0095* (2013.01); *F05D 2220/323* (2013.01); *F05D 2260/80* (2013.01); *F05D 2260/98* (2013.01)
(58) Field of Classification Search
CPC ........... F05D 2220/323; F05D 2260/80; F05D 2260/98; F05D 2260/84; F16N 2210/08; F16N 19/006; F01D 25/18
USPC ........................................................ 184/6.4
See application file for complete search history.

(56) References Cited

OTHER PUBLICATIONS

French Preliminary Search Report dated Aug. 29, 2018 in French Application No. 1762603 filed on Dec. 20, 2017, 1 page.

\* cited by examiner

DEVICE FOR SUPPLYING AN OIL TANK FROM A SECOND TANK

BACKGROUND OF THE INVENTION

Field of the Invention

The subject of the invention is a device, provided for an aircraft engine, for supplying a tank with oil by a second tank.

DESCRIPTION OF THE RELATED ART

Some aircraft include a device that allows for the supplying of oil tanks adjacent to the engines and that ensures the lubrication thereof with oil originating from a second tank, located elsewhere in the aircraft, generally common to all the engines and connected to the tanks of the engines by respective devices comprising a supply duct, a pump, and a control means with automatic operation or controlled by an operator; the control can be continuous or via pulses, at each one of which a determined dose of oil is assumed to be delivered.

Such devices, often called ORRS (Oil Remote Replenishing System), make it possible to avoid having to visually check the oil levels in the tanks of the engines, as well as the manual fillings, and they therefore offer better convenience, since it becomes unnecessary to open the nacelles that contain the engines and the tanks thereof, which in particular needs a ladder or stepladder.

It is necessary to prevent underfillings of the tank, which would interrupt correct lubrication, as well as overfillings which are also detrimental to the proper operation of the engines. The control device is therefore informed by a sensor that evaluates the oil level inside each tank of the engine and which makes it possible to evaluate the suitable supply does, i.e. the actuation duration of the pump or the number of the operating pulses thereof. The sensors most often used in practice have a magnetic float sliding on a vertical column and controlling the switching of relays disposed in rows in front of the column. These sensors, presented as robust and reliable, are nevertheless subject to deviations in measurement which can cause an incorrect filling and the arrival of one of the prohibited situations (oil level too high or too low) mentioned hereinabove, without the operator having the possibility to notice this other than through a meticulous visual inspection in the nacelle.

Document FR 3 013 330 A describes an aircraft device wherein the engine tanks are replaced with a common tank that supplies each one of the engines. It is noted that the tanks present in the nacelles are assumed to be entirely eliminated. If the advantage of avoiding inspections or interventions that are too frequent in the nacelles is obtained, it is by no means obvious that suitable doses of oil are delivered. The document mentions that the central tank is provided with an oil level gauge of which the information can be transmitted to the control electronics of the engines. It is plausible to think that doses required by the electronics are delivered to each one of the engines; but the adequacy with actual needs is not guaranteed, if for example the sensor is defective, the needs in oil were incorrectly estimated, or an oil leak is present along the feed ducts.

And document FR 3 020 093 A1 describes a device with two tanks connected together, of which one is provided with a level sensor that makes it possible to control the opening of a valve that allows for the filling of the tank with the contents of the other tank.

BRIEF SUMMARY OF THE INVENTION

In a general form, an aspect of the invention is a device that comprises a first oil tank adjacent to a propulsion engine of the aircraft, a second oil tank separate from the engine, a system for supplying the first tank with oil extracted from the second tank, a first sensor of the oil level in the first tank, a unit for controlling the supply system, sensitive to measurements from the first sensor, characterised in that it comprises a unit for estimating and comparing doses of oil extracted from the second tank and of doses of oil received by the first tank.

This device can be used by the following method. As long as the estimation of the doses of oil extracted from the second tank concord rather well with the quantity measurements of the filling of the first tank, the device is assumed to be operating correctly: it is unnecessary to conduct routine inspections of tanks and in particular of the first among them; otherwise, the device reveals a deterioration that can either concern the sensor of the first tank, or the integrity of the supply device, among the substantial potential causes. An alert can then be given.

Estimating the doses of oil delivered by the second tank can be done in many ways: either by a calculation based on a multiplication of the number of delivery pulses of oil, supposing that the quantity provided at each pumping pulse is known and invariable; or, by a sensor provided on the second tank and that can optionally and advantageously be a level sensor of the type similar to that of the first tank. In this latter case, the sensors can both have a magnetic float and a row of switches succeeding one another along a vertical line of float movement.

Another aspect of the invention is an aircraft into which this device is integrated.

The second tank can then be a single tank placed in a fuselage of the aircraft the first tank and the supply system existing in several copies on the sides of the aircraft at the locations where the engines are located, in particular under the wings.

As for the alert device, it is considered, if it exists, to place it in a dashboard of a cockpit of the aircraft.

BRIEF DESCRIPTION OF THE SEVERAL VIEWS OF THE DRAWINGS

The invention shall now be explained in more detail using the following figures, which show an embodiment of it given solely for the purposes of information.

DETAILED DESCRIPTION OF THE INVENTION

Figure 1:
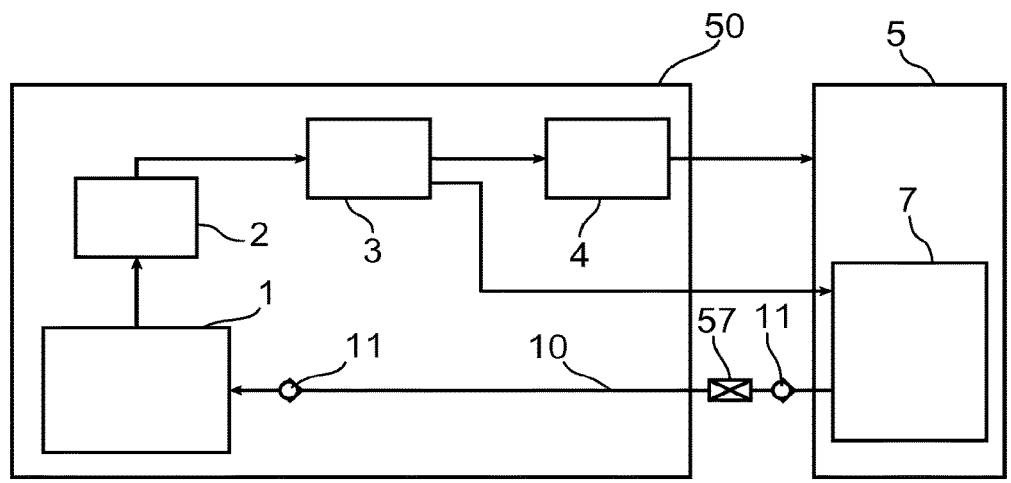
FIG. 1 shows a known device.
Figure 2:
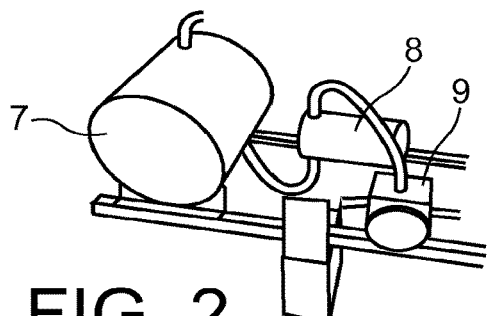
FIG. 2 shows more concretely the second tank or aircraft tank.
Figure 3:
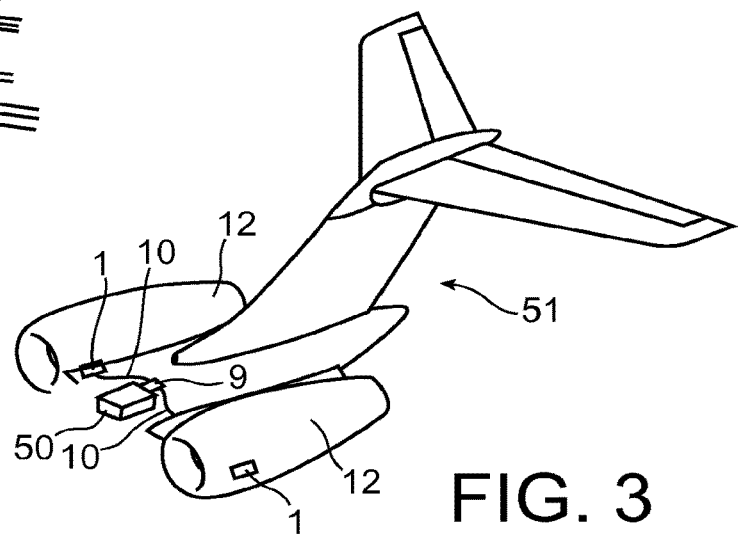
FIG. 3 shows a complete device, where the second tank serves several first tanks.

FIG. 1 diagrammatically shows a known device. An engine tank 1 is provided with an oil level sensor 2, that communicates its measurements to an acquisition unit 3. When the latter deems that the oil level is insufficient, it sends a signal to a correction request unit 4 which causes a supply system 5 to intervene. The supply system 5 comprises an aircraft tank 7 (FIG. 2) provided with an electric pump 8 and, downstream of the latter, a switching valve 9 through which the aircraft tank 7 can supply the engine tank 1 with oil by opening a supply duct 10 that connects them, with this supply duct 10 being provided with check valves 11 at the terminals of the tanks 1 and 7. As shown in FIG. 3, an engine tank 1 is present at each one of the engines 12 of an aircraft 51 shown only partially and served by a particular supply duct 10, and the switching valve 9 makes it possible to choose in turn which one of the supply ducts 10 to open and which one of the tanks of engine 1 to be supplied. The supply system 5 common to the various engines 12 and engine tanks 1 is placed in the fuselage of the aircraft 51. The second tank 7 is in general provided with a visual oil level gauge. The verification of the filling thereof is done during maintenance between successive flights. When the filling is carried out and the sensor 2 indicates a sufficient level, the acquisition unit 3 indicates this to the supply system 6, which interrupts the operation of the pump 8. Alternatively, the controls can be carried out through an operator. The engine tank 1, the sensor 2, the acquisition unit 3 and the correction control unit 4 are located in an integrated power system (IPPS) 50, separated from the aircraft 51, and the communications are carried out preferably by wire, analogically or digitally, for example using a data bus of the ARINC type.

Figure 4:
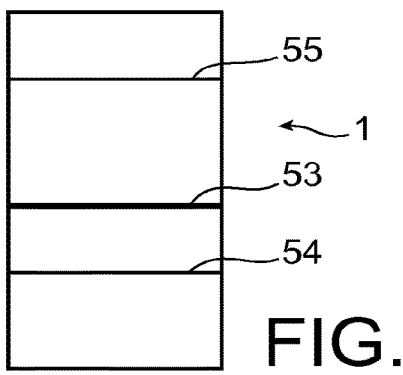
FIG. 4 shows an oil tank.

FIG. 4 diagrams the necessity of maintaining an oil level 53 between a lower limit 54 and an upper limit 55 inside each engine tank 1, so as to prevent both a lubrication fault in the engine 12 and an excessive filling, the top of the tank 1 being an aeration and expansion volume of the oil that must remain free. Deviations from the sensor 2 which would result either in overestimating or in underestimating the quantity of oil and the height of the level 53 must therefore both be avoided.

Figure 5:
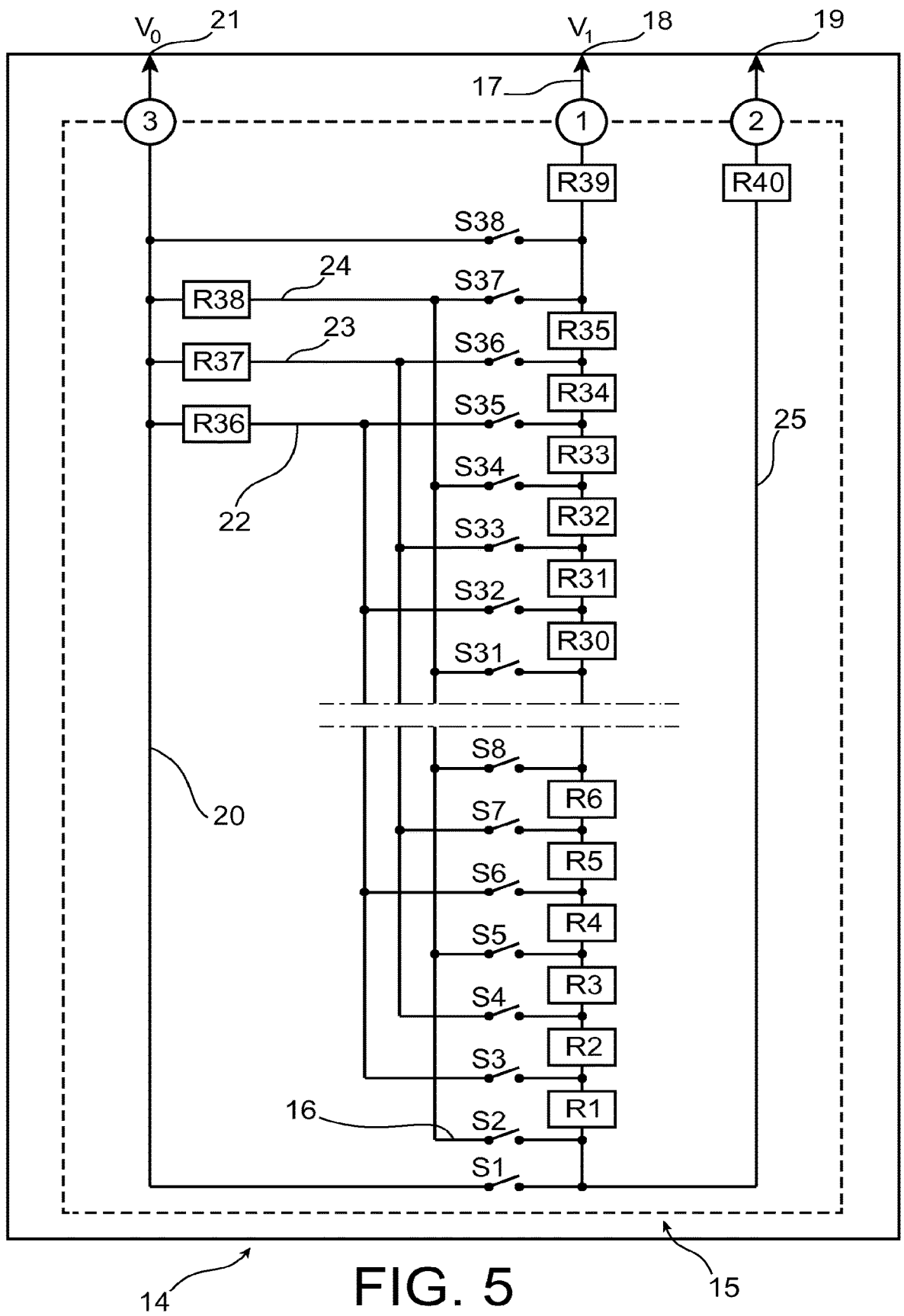
FIG. 5 shows a level sensor.

A type of level sensor that is frequently encountered in this field is a sensor with a magnetic float, comprising, as shown in FIG. 5, an electrical circuit 14 comprising a row of switches 15 noted S1 to S38, open at rest and of which each one is connected by an electrical connection 16 to a supply line 17, (leading to a supply terminal 18 on one side, and to a ground terminal 19 through a return line 25 on the other side), and to a signal line 20 leading to a signal terminal 21. The electrical connections 16 are grouped together into three bundles 22, 23 and 24 before reaching the signal line 20, according to a regular device wherein the switches 15 noted S2, S5, S8, . . . , S35 arriving at a first bundle 22, the following switches 15 noted S3, S6, S9, . . . , S36 at a second bundle 23, and the other switches 15 noted S4, S7, S10, . . . , S37 at a third bundle 24. The end switches 15 noted S1 and S38 are however an exception by being connected directly and individually to the signal line 20. Resistors R1, R2, R3, . . . , R35 are present on the supply line 17 between each connection 16 for the switches 15 noted S2 to S37; other resistors R36 to R38 are present respectively on the bundles 22, 23 and 24; and resistors R39 and R40 are present respectively on the supply line 17 between the supply terminal 18 and the switch 15 noted S38 which is the closest to it, and on the return line 25.

Figure 6:
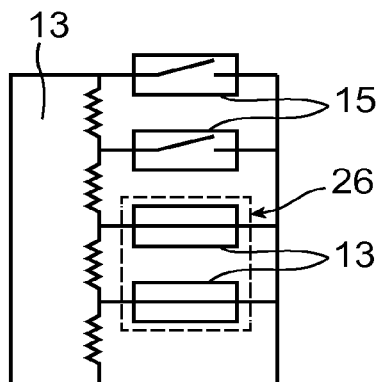
FIGS. 6 and 7 show two operating states of the sensor.
Figure 7:
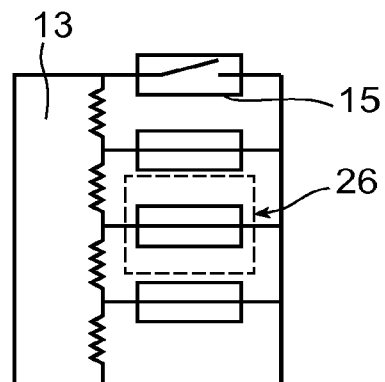

The sensor 2 is supplemented by a magnetic float 26, shown in FIGS. 6 and 7, and which is able to close either two consecutive switches 15, or three consecutive switches 15 according to the height thereof. The magnetic float 26 is for this placed in a vertical strut of the tank 1 in such a way as to be able to slide therein, this strut being placed in front of the electrical circuit 14, and the magnetic float 26 therefore facing the row of switches 15 by following the variations in the level of oil 53.

The height of the magnetic float 26 can be deduced by the ratio between the voltages V0 and V1 respectively present at the signal terminal 21 and at the supply terminal 18 with respect to the ground terminal 19, according (for example) to the following formula:

$$V_0 = V_1 \frac{(R3 + R2 + R1 + R40) + 1/2(R5 + R4)}{(\sum_{n=1}^{35} Rn + R39 + R40)}$$

if, the magnetic float 26 closes the switches 15 noted S5, S6 and S7. The theoretical function that gives the oil level 53 according to the ratio V0/V1 is linear and given in FIG. 8.

Figure 8:
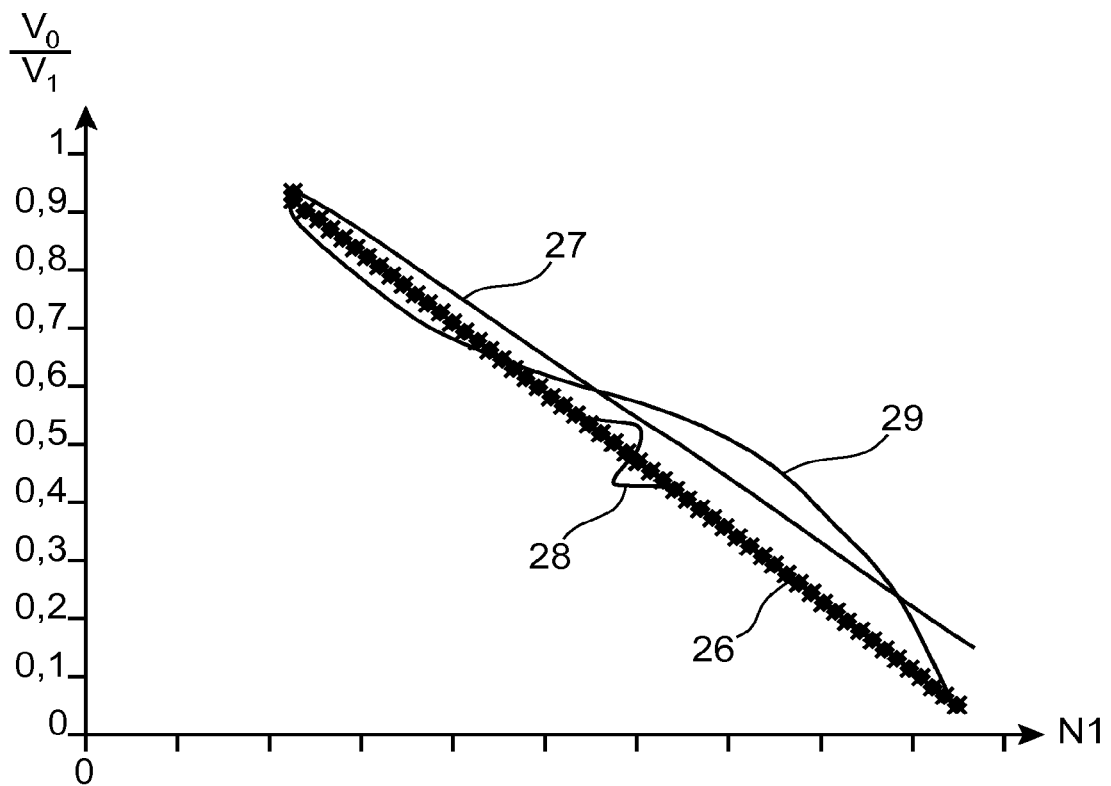
FIG. 8 shows output signals, correct or not, of the sensor.

The sensor 2 is however subject to degradations of the constituents thereof, which are passed on by deviations on the measurements. The origins of these degradations can be due to ageing produced by thermal or mechanical cycles, vibrations, fatigue or chemical alteration, among others. The main degradations that can be considered relate to the connections at the location of the terminals, the appearance of additional resistances or the increase in resistances on the electrical lines, or the blocking or the short-circuiting of some of the switches 15. An extreme situation is the blocking of the magnetic float 26 at a fixed height. Although the curve 52 (straight) of FIG. 8 shows the signal resulting from a correct operation of the sensor 2, the curves 27, 28 and 29 consisting of a different slope, of a local disturbance of the oscillatory type, and a disturbance consisting of an underestimating of the signal with a hardly filled tank and an overestimating of this signal when the tank is more filled, can appear. These disturbed functions correspond respectively to an additional resistance on the return line 25, a switch 15 remaining open and exercising its disturbance only when the magnetic float 26 passes in front of it, and a short-circuit of a resistor between two of the switches 15. Other disturbed functions can be encountered, but all have the characteristic, useful for the proper execution of the invention, that these disturbances with respect to normal signal operation (of the curve 52) have different intensities along this function, therefore according to the degree of filling of the tank.

Figure 9:
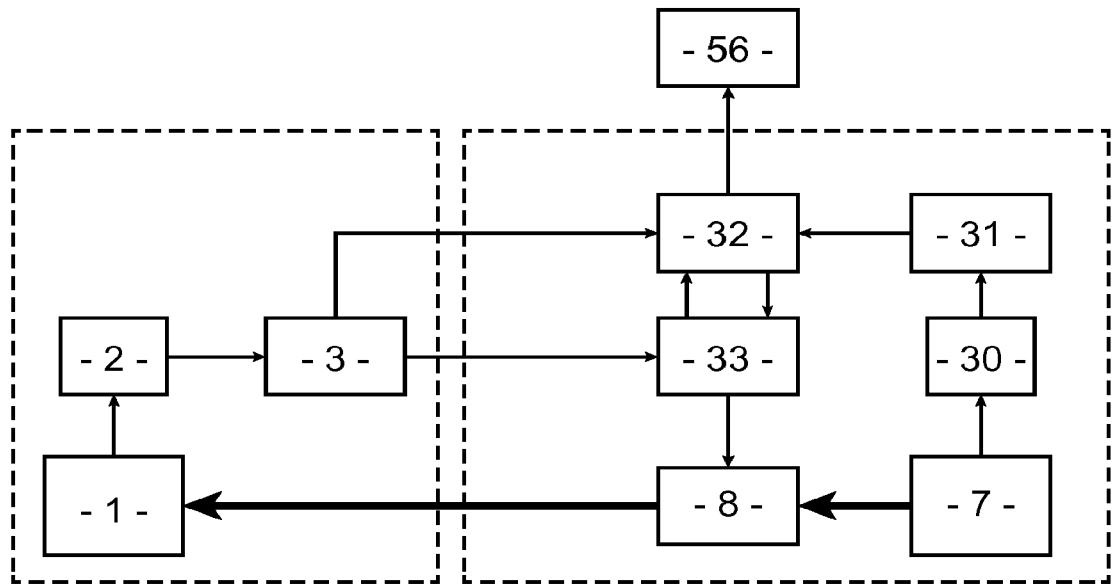
FIGS. 9 and 10 show two possible embodiments of the invention.

An embodiment of the invention shall now be described using FIG. 9. The device further comprises the known engine tank 1, the sensor 2, the acquisition unit 3 and the correction request unit 4, and the engine tank 1 is further supplied by the aircraft tank 7 by means of the supply system 5. The aircraft tank 7 is however provided with an oil level sensor 30 that can be similar to the sensor 2, and which therefore delivers a signal to an acquisition unit 31 similar to the acquisition unit 3. The signals of the acquisition units 3 and 31 are both supplied to an error detection unit 32 which governs a control unit 33 of the pump 8. The operation of the invention is as follows: each dose of oil supplied by the aircraft tank 7 must reach the engine tank 1 after a short time. The sensors 2 and 30 make it possible to measure the variations in the oil levels caused by the doses extracted from the aircraft tank 7 and the doses, normally identical, reaching the engine tank 1. The error detection unit 32 estimates these doses from the measurements taken by the sensors 2 and 30 and compares them. If one of the sensors 2 and 30 is operating incorrectly and a disturbance of the type of those of FIG. 8 appears, the estimations of doses are different. If an inconsistency threshold of the estimations is reached, it is possible to signal a supply fault by activating an alert or alarm device or 56 that arrives at the cockpit of the aircraft 51 and triggered by the error detection unit 32. The risk of incorrect filling will thus be reported, which will make it possible to take the necessary maintenance measures as soon as the flight has ended.

An inconsistency in the estimations will also be identified with other faults of the device, such as an oil leak outside the supply duct 10.

Figure 10:
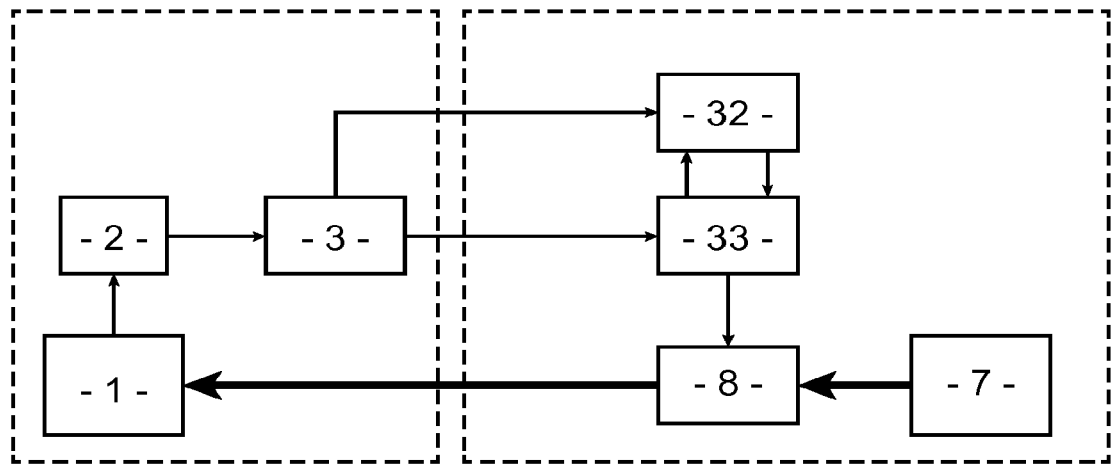

A slightly different design is given in FIG. 10, and which differs from the preceding one in that the second sensor 30 and the acquisition unit 31 thereof are absent. The supply control is then carried out by pulses, that can be applied manually by an operator, in order to trigger at each one of them a temporary operation and of invariable duration of the pump 8, assumed to deliver a dose of known quantity and also invariable of oil at each one of the pulses in the engine tank 1. The comparison made by the error detection unit 32 then concerns estimations of the volume of oil received by the engine tank 1 according to the variations in level indicated by the sensor 2 and the volume extracted from the aircraft tank 7 according to the number of pulses, that the control unit 33 communicates to the error detection unit 32. If a difference that exceeds a threshold appears between the two estimations, a fault of the device is deduced therefrom, and the alarm can be given as hereinabove.

The device in accordance with the invention can be carried out in forms that are different from those that have been indicated. In particular, the electronic equipment can belong to a single computer or to different computers.

However again, the second sensor 30 could be replaced, for example, with a flowmeter 57 installed on the supply duct 10 leading from the aircraft tank 7 to the engine tank 1, and which would measure the oil flowrate leaving the aircraft tank 7. The comparisons would be made as hereinabove, with the measurements from the flowmeter 57 being transmitted to the acquisition unit 31 already encountered.

The invention claimed is:

1. An aircraft, comprising:
   a first oil tank adjacent to a propulsion engine of the aircraft;
   a second oil tank separate from the engine;
   a supply system for supplying the first tank with lubrication oil extracted from the second tank;
   a first sensor of oil level in the first tank;
   a second sensor of oil level in the second tank; and
   a unit for controlling the supply system, comprising a comparing unit for estimating and comparing doses of oil extracted from the second tank with doses of oil received by the first tank, the comparing unit being informed by units for acquiring measurements from said first and second sensors.

2. The aircraft according to claim 1, wherein the first sensor and the second sensor are sensors with a magnetic float and with a row of switches succeeding one another along a vertical row of float movement.

3. The aircraft according to claim 1, wherein the comparing unit is informed by the unit for controlling the supply system, according to a duration of operation of the supply system.

4. The aircraft according to claim 1, further comprising an alarming device, triggered by the comparing unit, when an inconsistency between estimations of the doses received by the first tank and estimations of the doses extracted from the second tank exceeds a threshold.

5. An aircraft comprising:
   a plurality of first oil tanks adjacent to respective propulsion engines of the aircraft, said first oil tanks and propulsion engines being on opposite sides of the aircraft;
   a single second oil tank separate from the propulsion engines and placed in a fuselage of the aircraft;
   respective supply systems for respectively supplying the first tanks with lubrication oil extracted from the second tank;
   a first sensor of oil level in each of the first tanks;
   a second sensor of oil level in the second tank;
   a unit for controlling each of the supply systems, comprising a comparing unit for estimating and comparing doses of oil extracted from the second tank with doses of oil received by a respective one of the first tanks, the comparing unit being informed by units for acquiring measurements from the second sensor and a respective one of the first sensors.

6. The aircraft according to claim 5, wherein each said first sensor and the second sensor are sensors with a magnetic float and with a row of switches succeeding one another along a vertical row of float movement.

7. The aircraft according to claim 5, wherein each said comparing unit is respectively informed by the unit for controlling the supply system, according to a duration of operation of the supply system.

8. The aircraft according to claim 5, further comprising an alarming device, triggered by each said comparing unit, when an inconsistency between estimations of the doses received by the first tanks and estimations of the doses extracted from the second tank exceed a threshold.

* * * * *